United States Patent Office 3,463,912
Patented Aug. 26, 1969

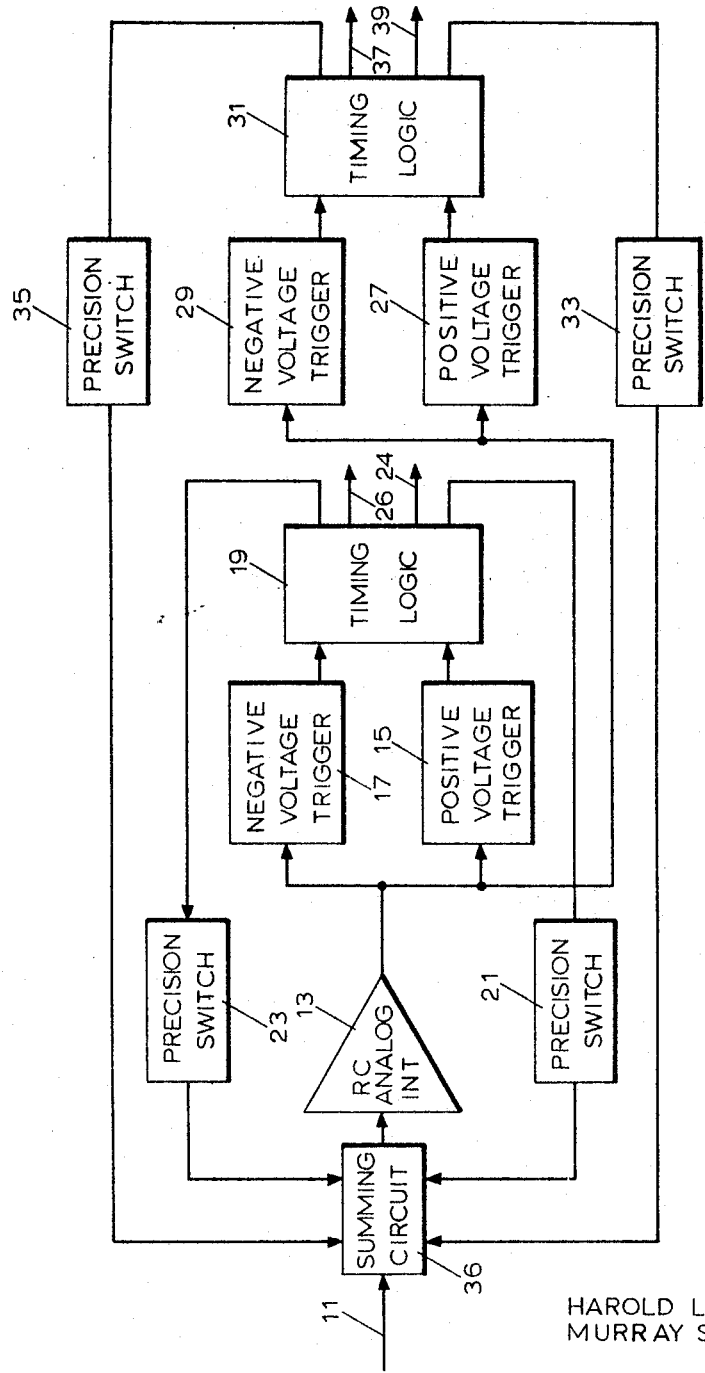

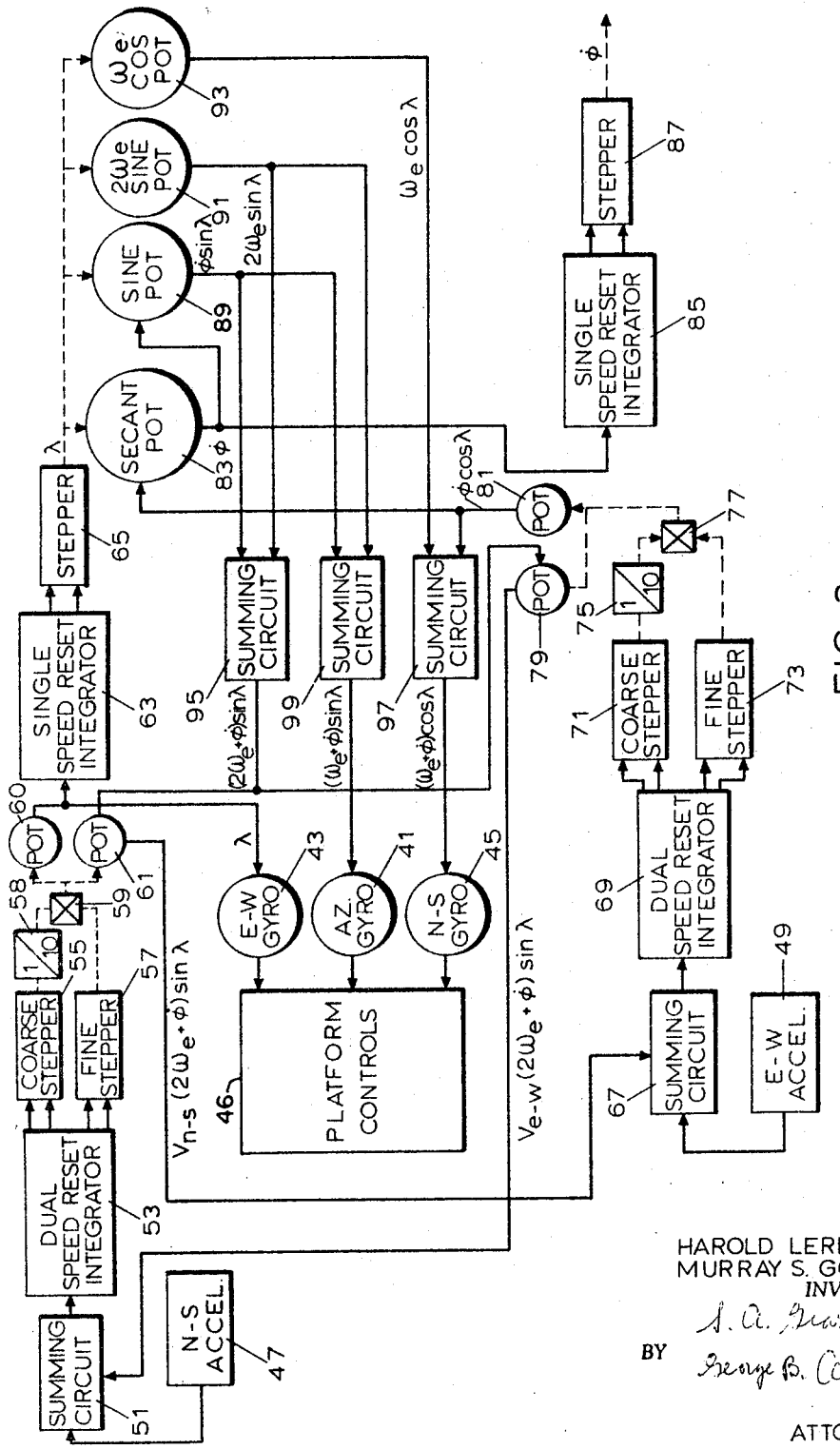

3,463,912
DUAL SPEED RESET INTEGRATOR
Harold Lerman, Paramus, N.J., and Murray S. Goldstein, Spring Valley, N.Y., assignors to Singer-General Precision Inc., a corporation of Delaware
Original application Sept. 30, 1963, Ser. No. 312,684. Divided and this application Jan. 25, 1968, Ser. No. 718,280
Int. Cl. G06g 7/18
U.S. Cl. 235—183           2 Claims

ABSTRACT OF THE DISCLOSURE

A drive arrangement for feeding an input to a stepper motor limited in the number of pulses per second that it can receive. The input is fed to summing means and the summing mean output is to an analog integrator whose output is to two separate reset integrators which feed two types of pulses to the stepper motor. Feedback lines go from the reset integrators to the summing means. Both types of reset pulses have the same inpulse content and are actually identical in the dual speed reset integrator of the present invention. The different effect in the resetting of the analog integrator output is achieved by means of the summing means, which combines the reset pulses of the first type and the second type and applies them to the input of the analog integrator. This summing means achieves the desired different resetting effects by attenuating the reset pulses of the one type ten times as much as the reset pulses of the other type are attenuated.

---

This application is a division of copending application of Harold Lerman and Murray Goldstein for Inertial Navigator Using Analog Integrators With Digital Logic, Ser. No. 312,684, filed Sept. 30, 1963, assigned to the present assignee and covers an invention relating to reset integrator circuitry particularly useful in navigation systems of the type disclosed and claimed in the aforementioned copending application.

A primary requirement of a highly accurate inertial navigation system is having highly accurate first and second integrators. The first integrators are used to derive velocity from acceleration and the second integrators are used to derive position from veloctiy. The inertial navigation system of the present invention has a greatly improved accuracy because it uses digital reset integrators, which are extremely accurate, for the first and second integrators.

A digital reset integrator comprises an analog integrator, the output voltage of which is fed to a pair of triggers. One of the triggers, referred to as a positive voltage trigger, will cause a negative reset pulse with a precise impulse content to be applied to the input of the analog integrator when a positive output signal voltage of the analog integrator reaches the trigger value of the positive voltage trigger. The negative reset pulse will cause the output signal voltage of the analog integrator to change in the negative direction by an amount substantially equal to the trigger value. The other trigger, referred to as the negative voltage trigger, will cause a positive reset pulse with a precise impulse content to be applied to the input of the analog integrator when a negative output signal voltage of the analog integrator reaches the trigger value of the negative voltage trigger. The trigger value for the negative voltage trigger and the impulse content of the positive reset pulses have the same magnitudes as the trigger value for the positive voltage trigger and the impulse content of the negative reset pulses. Accordingly a positive reset pulse will cause the output voltage of the analog integrator to change in the positive direction by an amount equal to the trigger value for the negative voltage trigger. The reset integrator produces an output pulse on one channel each time it produces a negative reset pulse and produces an output pulse on a second channel each time it produces a positive reset pulse. When a signal to be integrated is applied to the input of the analog integrator the number of pulses produced on the first channel minus the number of pulses produced on the second channel will represent the integral of the applied signal.

In order to make use of digital reset integrators in an analog inertial navigation system, means are required to make use of the digital output of the reset integrators in an analog manner in the navigation system computer. In accordance with the present invention stepper motors which rotate incrementally in response to the output pulses are used in conjunction with potentiometers to convert the pulse output from the reset integrators to analog signals. However, conventional stepper motors are limited in the number of pulses per second that they can receive. Because of this limitation and because the acceleration signals will be relatively large the reset pulses in the reset integrator used for first integrators must each effect a relatively large voltage change. However, the amount by which the reset pulses change the output voltages of the analog integrators is inversely proportional to the resolution of the output from the reset integrators. Therefore, in the system of the present invention, in order to obtain the desired resolution, a dual speed reset integrator was designed to perform the function of the first integrators. This dual speed reset integrator makes use of two types of reset pulses, one resetting the output voltage of the analog integrator by a small amount and the other resetting the output voltage of the analog integrator by a large amount. In the specific embodiment of the present invention the latter type reset pulses cause voltage changes ten times that caused by the former type. The former type of reset pulse provides the desired resolution and the latter type of reset pulse provides the desired response to the large acceleration input signals.

The dual speed reset integrator comprises a first pair of triggers controlling the application of the former type of reset pulses and having trigger values corresponding to the former type of reset pulses and a second pair of triggers controlling the application of the latter type of reset pulses and having trigger values corresponding to the latter type of reset pulses. Both types of reset pulses have the same impulse content and are actually identical in the dual speed reset integrator of the present invention. The different effect in the resetting of the analog integrator output is achieved by means of a summing circuit, which combines the reset pulses of the first type and the second type and applies them to the input of the analog integrator. This summing circuit achieves the desired different resetting effects by attenuating the reset pulses of the former type ten times as much as the reset pulses of the latter type are attenuated.

A still further object of the present invention is to provide improved integration in inertial navigation systems.

A still further object of the present invention is to provide more accurate integration in inertial navigation systems.

A still further object of the present invention is to provide an improved dual speed reset integrator.

Further objects and advantages of the present invention will become readily apparent as the following detailed description of the invention unfolds, and when taken in conjunction with the drawings, wherein:

FIG. 2 illustrates the dual speed reset integrator of the present invention; and FIG. 3 illustrates an inertial navigation system in which an integrator of the present invention forms a part.

Figure 1:
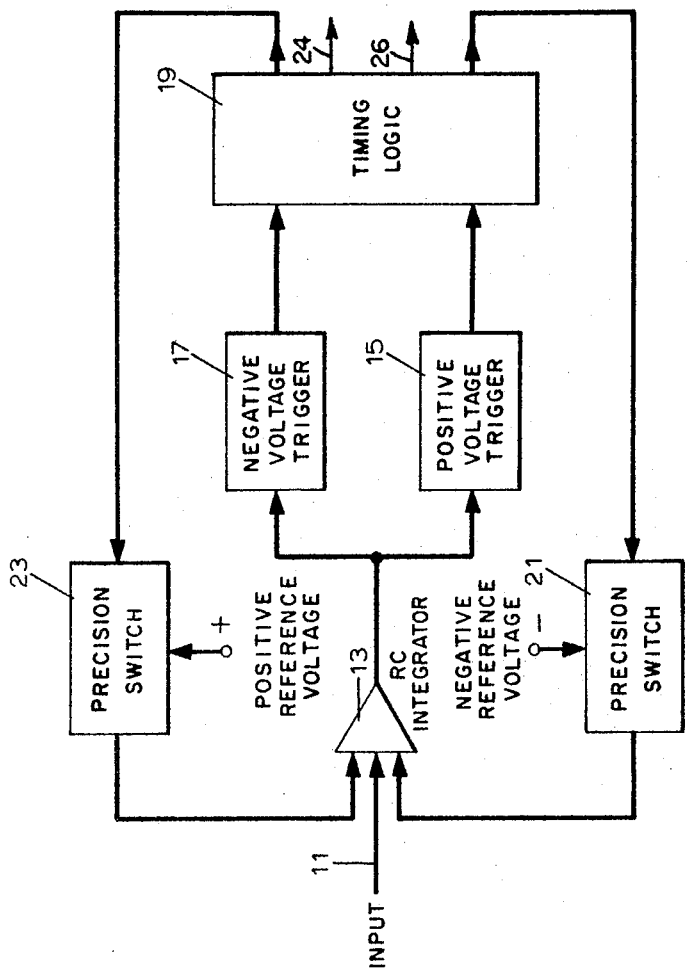
FIG. 1 illustrates a prior art reset integrator used in inertial navigation systems.

The navigational system herein disclosed makes use of digital reset integrators of the type disclosed in a copending application Ser. No. 279,422 entitled Digital Reset Integrator, invented by Allan Gerard, Harold Lerman and Murray Goldstein and filed on May 10, 1963, now Patent No. 3,322,942, issued on May 30, 1967.

As disclosed in this patent and as shown in FIG. 1 in the digital reset integrator, the analog signal to be integrated is applied at an input 11. From the input 11 the signal is applied to the input and an RC analog integrator 13, which, except for having a high scale factor, is a conventional RC analog integrator. The output signal voltage from the RC analog integrator 13 is applied to a positive voltage trigger 15 and to a negative voltage trigger 17. The triggers 15 and 17 are set to detect when the output signal voltage of the integrator 13 reaches a predetermined magnitude. This magnitude of voltage is referred to as the trigger magnitude. The positive voltage trigger 15 detects when a positive output signal voltage of the integrator 13 reaches the trigger magnitude. Upon detecting this event the positive voltage trigger 15 applies an enabling signal to timing logic 19. The negative voltage trigger 17 detects when a negative output signal voltage of the integrator 13 reaches the trigger magnitude and in response thereto applies an enabling signal to the timing logic 19. The timing logic 19, responsive to receiving an enabling signal from the positive voltage trigger 15, closes a precision switch 21 for a precise time interval. When the precision switch 21 is closed, it applies a precisely selected negative reference voltage to the input of the integrator 13. Thus a negative pulse having a precise amplitude and a precise length is applied to the input of the integrator 13 in response to the output signal voltage of the integrator 13 being positive and reaching the trigger magnitude. The integrator 13 will integrate the applied negative pulse and reflect this integration in its output signal voltage. The length of time that the precision switch 21 is closed and the magnitude of the negative reference voltage that is applied to the integrator 13 when the precision switch 21 is closed are selected so that the impulse content of the negative pulse applied to the integrator 13 is such to drive the output signal voltage of the integrator 13 back substantially to zero. The timing circuit 19, in response to an enabling signal from the negative voltage trigger 17, will close a precision switch 23 for the same precise time interval that it closes the precision switch 21 in response to the enabling signal from the positive voltage trigger 15. When the precision switch 23 is closed, it applies a positive reference voltage to the integrator 13 so that a positive pulse is applied to the integrator 13 in response to a negative output voltage of the integrator 13 reaching the trigger magnitude. The positive reference voltage applied through the switch 23 to the integrator 13 has the same magnitude as the negative reference voltage applied to the integrator 13 through the switch 21. Thus when the output signal voltage of the integrator 13 is negative and reaches the trigger magnitude, a positive pulse will be applied to the integrator 13 and this positive pulse, upon being integrated by the integrator 13, will drive the output signal voltage of the integrator 13 substantially back to zero. It is not essential that the pulse applied to the integrator 13 by the precision switches 21 and 23 drive the output signal voltage of the integrator 13 precisely back to zero, but it is essential that they both have a precisely predetermined impulse content, as a variation in the impulse content of these pulses will cause a scale factor error in the output from the integrator. Each time the timing logic 19 closes the precision switch 21 it produces a pulse on an output channel 24 and each time the timing logic 19 closes the precision switch 23 it produces a pulse on an output channel 26. The number of pulses produced on output channel 24 minus the number of pulses produced on output channel 26 will represent the integral of the signal applied on input 11 and the pulses produced on outputs 24 and 26 will represent positive and negative increments of this integral, respectively.

The above described reset integrator is used in an inertial navigation system to integrate accelerometer outputs to provide signals representing velocity and to integrate velocity representing signals to provide signals representing position. To produce the velocity representing signals from the output of the integrators integrating the accelerometer output signals, the output pulses from the reset integrators are used to drive stepping motors. The stepping motors then position the movable contacts on the potentiometers to provide analog signals representing velocity.

The maximum velocity of an aircraft can range from 1,000 to 300 knots. It is desirable to know the value of this velocity to a resolution of about 0.1 knot. If, for example, the acceleration of the aircraft is on the order of 200 knots per second, then in order to get the desired resolution of 0.1 knot, the pulse rate would have to be the acceleration of 200 knots per second divided by the resolution of 0.1 knot, or in other words, 2,000 pulses per second. However, there are no stepper motors presently available which can accept a rate as fast as 2,000 pulses per second. Because of this incapability of presently available stepping motors the reset integrator integrating the acceleration output is designed to be dual speed. By using a dual speed reset integrator the desired resolution of 0.1 knot is achieved with a stepper motor which is only capable of accepting 200 pulses per second.

The dual speed reset integrator of this invention is illustrated in FIG. 2. As shown in FIG. 2, part of this integrator is identical to the reset integrator shown in FIG. 1 and operates in exactly the same manner. It comprises the analog integrator 13 and the positive and negative voltage triggers 15 and 17, the timing logic 19 and the precision switches 23 and 21. The output from the analog integrator 13, in addition to being fed to the positive and negative voltage triggers 15 and 17, is fed to two additional positive and negative voltage triggers 27 and 29. The positive and negative voltage triggers 27 and 29 differ from the positive and negative voltage triggers 15 and 17 in that the trigger magnitude for the triggers 27 and 29 is ten times that of the triggers 15 and 17. The trigger magnitude for the positive and negative voltage triggers 15 and 17 is an output voltage of the integrator 13 representing a velocity of 0.1 knot. The trigger magnitude for the positive and negative triggers 27 and 29 is an output voltage of the integrator 13 representing a velocity of 1.0 knot. The positive and negative voltage triggers 27 and 29 apply signals to a timing logic circuit 31, which responds to these signals to control a pair of precision switches 33 and 35 in the same manner that the timing logic circuit 19 responds to the signals from the positive and negative voltage triggers 15 and 17 to control the precision switches 21 and 23. The precision switches 33 and 35 are identical to the precision switches 21 and 23 and accordingly the precision switch 33 will produce an output pulse having a precise impulse content whenever the output signal voltage of the integrator 13 reaches a value representing plus one knot, and the precision switch 35 will produce an output pulse having a precise impulse content whenever the output signal of the integrator 13 reaches a value representing minus one knot. Since the precision switches 33 and 35 are identical to the precision switches 21 and 23, respectively, and since the timing logic circuit 31 is identical to the timing logic circuit 19, the impulse content of the output pulses produced by the precision switches 33 and 35 will be the same as that produced by the precision switches 21 and 23. The output pulses from the precision switches 21, 23, 33 and 35 are applied to a summing circuit 36 in which the output pulses from the precision switches 33 and 35 are summed through resistances one-tenth as large as the resistances through which the output pulses from the precision switches 21 and 23 are summed, so that the output pulses of the precision switches 21 and 23 are attenuated ten times as much as the output pulses from the precision switches 33 and 35. As a result, an output pulse from the precision switch 33 will cause the output voltage of the integrator 13 to change in a negative direction by an amount ten times as great as that caused by an output pulse from the precision switch 21 and an output pulse from the precision switch 35 will cause the output voltage of the analog integrator 13 to change in the positive direction by an amount ten times that caused by an output pulse of the precision switch 23. Thus an output pulse from the precision switch 33 or the precision switch 35 will change the output voltage of the analog integrator 13 by an amount substantially equal to the trigger magnitude of the positive and negative voltage triggers 27 and 29.

When the acceleration signal applied to the input of the integrator 13 is a relatively small acceleration, the precision switches 21 and 23 will operate to continuously reset the output voltage of the integrator 13 back near zero and the precision switches 33 and 35 will not operate. However, when a signal representing a large acceleration is applied to the input 11, the precision switches 21 and 23 will not operate fast enough and the output voltage of the integrator 13 will rise to the trigger magnitude of the positive and negative voltage triggers 27 and 29. As a result, one of the precision switches 33 and 35 will apply a pulse to the integrator 13 to reset its output voltage back near zero. Each time the timing logic 31 causes the precision switch 35 to apply a reset pulse to the analog integrator 13, it also produces a pulse on an output channnel 37, and each time the timing logic 31 causes the precision switch 33 to apply a pulse to the integrator 13, it will produce a pulse on an output channel 39. The integral of the signal applied to the input 11 representing acceleration or in other words the velocity, can be determined by counting the pulses produced on outputs 37 and 39 as well as on output channels 24 and 26. Ten times the number of pulses produced on output channel 39 plus the number of output pulses produced on output channel 24 minus ten times the number of pulses produced on output channel 37 minus the number of pulses produced on output channel 26 will represent the integral of the signal applied to input 11 or in other words will represent the velocity. The output pulses from the timing logic 31 on channels 37 and 39 are referred to as the coarse output of the dual speed integrator and the output pulses of the timing logic 19 on output channels 24 and 26 are referred to as the fine output of the dual speed reset integrator.

In the navigation system as illustrated in FIG. 3, three gyros 41, 43 and 45 are mounted on a platform (not shown). The gyro 41 is referred to as the azimuth gyro and signals from this gyro detect rotation of the platform about the vertical axis of the platform. The gyros 43 and 45 are referred to as the east-west and north-south gyros, respectively. The east-west gyro 43 detects rotation of the platform about the east-west axis and the north-south gyro 45 detects rotation of the platform about the north-south axis. The output signals of the gyros 41, 43, and 45 are fed to platform controls 46, which in response to these signals maintain the vertical axis of the platform aligned with true vertical and the north-south axis of the platform aligned with true north. A north-south accelerometer 47 is mounted on the platform to sense acceleration of the platform along the north-south axis of the platform. An east-west accelerometer 49 is mounted on the platform to sense acceleration of the platform along the east-west axis of the platform.

The output signal of the accelerometer 47 is applied to a summing circuit 51, where a correction signal is added to it, and then applied to the input of a dual speed reset integrator 53, which is an integrator as disclosed in FIG. 2. The coarse output of the dual speed reset integrator 53 is applied to a coarse stepper 55 and the fine output of the integrator 53 is applied to a fine stepper 57. The stepper 55 comprises a stepper motor together with appropriate logic circuitry to step in one direction in response to a pulse on one output channel of the coarse output of the integrator 53 and to step in the opposite direction in response to a pulse on the other output channel of the coarse output of the integrator 53. Similarly, the fine stepper 57 comprises a stepper motor with appropriate logic circuitry to step in one direction in response to an output pulse on one channel of the fine output of the integrator 53 and to step in the opposite direction in response to a pulse on the other output channel of the fine output of the integrator 53. The output of the coarse stepper 55 drives a gear train 58 which rotates its output shaft through ten times the angle through which its input shaft rotates. The output of the gear train 58 and the output of the fine stepper 57 are applied to a differential 59 where these two outputs are mechanically added together to provide a single output representing the velocity in a north-south direction. This output in the form of a shaft rotation drives two potentiometers 60 and 61. Potentiometer 60 has a constant DC voltage applied across it and produces an output signal representing velocity in the north-south direction, or in other words the rate of change of latitude represented by the symbol $$\dot{\lambda}, \lambda$$

being used to represent latitude. The output signal of the potentiometer 60 is used to torque the east-west gyro 43 and in this manner keeps the platform unpivoted about the east-west axis as the aircraft changes latitude. The output signal of the potentiometer 60 representing $$\dot{\lambda}$$

is integrated by a single speed reset integrator 63 such as that shown in FIG. 1. The output pulses of the integrator 63 are fed to a stepper 65 which comprises a stepper motor and appropriate logic circuitry to step in one direction in response to pulses on one output channel of the integrator 63 and to step in the opposite direction in response to pulses in the other output channel of the integrator 63. The angular position of the output shaft of the stepper 65 will accordingly represent the integral of the signal applied to the input of the integrator 63 and therefore will represent the latitude $\lambda$.

The output signal of the accelerometer 49 is applied to a summing circuit 67, where it has a correction signal added thereto, and then is applied to the input of a dual speed reset integrator 69 which is an integrator of the type illustrated in FIG. 2. The coarse output of the integrator 69 is applied to a coarse stepper 71 and the fine output of the integrator 69 is fed to a fine stepper 73. The coarse stepper 71 and the fine stepper 73 are like the coarse and fine steppers 55 and 57 and convert the coarse and fine outputs of the dual speed reset integrator 69 into shaft rotations. The shaft output of the coarse stepper 71 drives the input of a gear train 75, which multiplies the output shaft angle of the stepper by 10. The output of the gear train 75 and the output of the fine stepper 73 are mechanically added together by a differential 77 to produce a signal representing the integral of the signal applied to the input of the integrator 69. Accordingly, the angular position of the output shaft of the differential 77 will represent velocity in the east-west direction. The output shaft of the differential 77 is connected to drive the movable contacts of two potentiometers 79 and 81. The potentiometer 81 has a DC constant voltage applied across its resistance so the output signal of the potentiometer 81 will be proportional to the velocity in the east-west direction. The velocity in the east-west direction will be proportional to the quantity $$\dot{\phi} \cos \lambda$$

in which $$\dot{\phi}$$

is the rate of change of longitude $\phi$. Accordingly, the output signal of the potentiometer 81 can be used to represent the quantity $$\dot{\phi} \cos \lambda$$

The output signal of the potentiometer 81 is fed to a secant potentiometer 83, the movable contact of which is coupled to the shaft output of the stepper 65. The secant potentiometer 83 multiplies the output signal of the potentiometer 81 times the secant of $\lambda$ and as a result produces an output signal representing $$\dot{\phi}$$

This signal is applied to the input of a single speed reset integrator 85 of the type illustrated in FIG. 1. The pulse output of the integrator 85 is fed to a stepper 87 which is like the stepper 65 and converts the pulse output of the integrator 85 to an angular shaft position representing the integral of the signal applied to the input of the integrator 85. Accordingly the angular position of the output shaft of the stepper 87 will represent the longitude $\phi$.

The output shaft of the stepper 65 representing the latitude $\lambda$ also drives the movable contacts of a pair of sine potentiometers 89 and 91 and a cosine potentiometer 93. The output signal of the secant potentiometer 83 is applied across the resistance of the sine potentiometer 89 so that the potentiometer 89 produces an output signal representing $$\dot{\phi} \sin \lambda$$

The sine potentiometer 91 has a DC signal voltage applied across it representing the quantity $2\omega_e$ so that it produces an output signal representing $2\omega_2 \sin \lambda$. The output signals of the potentiometers 89 and 91 are added together by a summing circuit 95, which produces an output signal representing the quantity $$(2\omega_e + \dot{\phi}) \sin \lambda$$

The output signal of the summing circuit 95 is applied across the resistances of the potentiometers 61 and 79. Since the movable contact of the potentiometer 61 is coupled to the output shaft of the differential 59, the position of which represents velocity in the north-south direction, the potentometer 61 will produce an output signal representing the quantity $$V_{ns}(2\omega_e + \dot{\phi}) \sin \lambda$$

in which $V_{ns}$ is the velocity in the north-south direction. This output signal of the potentiometer 61 is applied to the summing circuit 67 and constitutes the correction signal added to the output signal of the accelerometer 49 prior to the integration by the integrator 69. Since the potentiometer 79 has its movable contact driven by the output shaft of the differential 77, the angular position of which represents velocity in the east-west direction, the potentiometer 79 will produce an output signal representing the quantity $$V_{ew}(2\omega_e + \dot{\phi}) \sin \lambda$$

in which $V_{ew}$ represents velocity in the east-west direction. This output signal of the potentiometer 79 is applied to the summing circuit 51 and constitutes the correction signal added to the output signal of the accelerometer 47 prior to its integration by the reset integrator 53.

The output signal of the potentiometer 81 representing $$\dot{\phi} \cos \lambda$$

and the output signal of the potentiometer 93 representing $$\omega_e \cos \lambda$$

are applied to a summing circuit 97 where these two signals are added together to produce an output signal representing the quantity $$(\omega_e + \dot{\phi}) \cos \lambda$$

This signal is used to torque the north-south gyro 45 so as to maintain the platform unpivoted about the north-south axis as the aircraft carrying this platform moves in the east-west direction. The output signal of the potentiometer 89 representing $$\dot{\phi} \sin \lambda$$

and the output signal of the potentiometer 91 representing $$2\omega_e \sin \lambda$$

are applied to a summing circuit 99, which adds the output signal of the potentiometer 89 to one half the output signal of the potentiometer 91. As a result the summing circuit 99 produces an output signal representing the quantity $$(\omega_e + \dot{\phi}) \sin \lambda$$

This signal is used to torque the azimuth gyro 41 to maintain the north-south axis of the platform aligned with true north as the aircraft moves in the east-west direction.

Thus there is provided a precise analog inertial navigation system making use of digital reset integrators according to this invention to provide the necessary integration. Because the reset integrators are used to provide the necessary integration, much greater accuracy is obtained than was heretofore possible with conventional analog integrators. Instead of using the dual reset integrator shown in FIGURE 2 for the first integrators, the system could use the dual speed reset integrator disclosed in the above-mentioned Patent No. 3,322,942. This and many other modifications may be made to the above described specific embodiment of the invention without departing from the spirit and scope of the invention.

What is claimed is:

1. A dual speed reset integrator comprising an input; summing means fed by said input, an analog integrator connected to said summing means, said analog integrator including an output terminal, first reset means connected to said output terminal responsive to the output signal of said analog integrator reaching a first predetermined magnitude to generate a reset pulse of precisely predetermined impulse content and having a polarity opposite to the polarity of the output signal of said analog integrator, a second reset means also connected to said output terminal responsive to the output signal of said analog integrator reaching a second predetermined magnitude greater than said first predetermined magnitude to generate a reset pulse of said precisely predetermined impulse content and having a polarity opposite to the polarity of the output signal of said analog integrator, first and second feedback means with first slow switch means and second fast switch means therein from said first and second reset means to said summing means, said first switch means operating only on a low input, said second switch means operating only on a large input, said summing means adding the signal applied to said input to the reset pulses generated by said second reset means plus a predetermined fraction of the reset pulses generated by said first reset means and applying the resulting signal to the input of said analog integrator, and stepper motor means including an input side and means coupling the outputs of said first and second reset means to the input side of said stepper means.

2. A combination as set forth in claim 1 wherein said stepper motor means includes a coarse stepper and a fine stepper motor and means for combining the output of said coarse and fine stepper motors and including speed change means interposed in the output of one of said motors.

References Cited

UNITED STATES PATENTS

| | | | |
|---|---|---|---|
| 3,188,455 | 6/1965 | Quick | 235—183 |
| 3,328,568 | 6/1967 | Masel | 235—183 |
| 3,340,387 | 9/1967 | Anderson | 235—183 X |

MALCOLM A. MORRISON, Primary Examiner

FELIX D. GRUBER, Assistant Examiner

U.S. Cl. X.R.

235—150.25; 307—229; 328—127